US008877095B2

(12) United States Patent
Matsuda et al.

(10) Patent No.: US 8,877,095 B2
(45) Date of Patent: *Nov. 4, 2014

(54) PROCESS FOR PRODUCTION OF FLUORESCENT SUBSTANCE

(71) Applicant: Kabushiki Kaisha Toshiba, Minato-ku (JP)

(72) Inventors: Naotoshi Matsuda, Chigasaki (JP); Yumi Fukuda, Tokyo (JP); Masahiro Kato, Naka-Gun (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/074,049

(22) Filed: Nov. 7, 2013

(65) Prior Publication Data

US 2014/0054500 A1 Feb. 27, 2014

Related U.S. Application Data

(62) Division of application No. 13/036,410, filed on Feb. 28, 2011, now Pat. No. 8,628,686.

(30) Foreign Application Priority Data

Aug. 31, 2010 (JP) .................................. 2010-193789
Feb. 3, 2011 (JP) .................................. 2011-021727

(51) Int. Cl.
| C09K 11/08 | (2006.01) |
| C09K 11/66 | (2006.01) |
| C01B 21/082 | (2006.01) |
| C09K 11/77 | (2006.01) |

(52) U.S. Cl.
CPC ......... *C09K 11/7728* (2013.01); *C01B 21/0826* (2013.01); *C01B 21/0821* (2013.01); *C01P 2002/52* (2013.01); *C09K 11/7734* (2013.01); *C01P 2002/84* (2013.01); *C01P 2002/72* (2013.01)
USPC .................................................. 252/301.4 F

(58) Field of Classification Search
USPC ................ 252/3.014 F, 301 R, 301.4 F
See application file for complete search history.

(56) References Cited

U.S. PATENT DOCUMENTS

| 7,443,094 B2 | 10/2008 | Sakane et al. |
| 8,303,847 B2 | 11/2012 | Gotoh et al. |
| 8,569,943 B2 * | 10/2013 | Mitsuishi et al. ............. 313/483 |
| 2006/0220520 A1 | 10/2006 | Sakane et al. |
| 2009/0026915 A1 | 1/2009 | Nagatomi et al. |
| 2009/0072195 A1 | 3/2009 | Fukuda et al. |
| 2009/0096361 A1 | 4/2009 | Fukuda et al. |
| 2010/0025632 A1 | 2/2010 | Fukuda et al. |
| 2010/0102707 A1 | 4/2010 | Fukuda et al. |
| 2010/0200874 A1 | 8/2010 | Shioi et al. |
| 2010/0224896 A1 | 9/2010 | Schmidt et al. |
| 2011/0057149 A1 * | 3/2011 | Fukuda et al. ......... 252/301.6 R |

FOREIGN PATENT DOCUMENTS

| JP | 2009-286995 | 12/2009 |
| JP | 2010-31201 | 2/2010 |
| JP | 2010-185009 | 8/2010 |
| JP | 2010185009 A * | 8/2010 |
| WO | WO 2007/105631 A1 | 9/2007 |
| WO | WO 2008041501 | 4/2008 |
| WO | WO 2009/031089 A1 | 3/2009 |

OTHER PUBLICATIONS

JP2010185009A machine translation.*
EIC search report Jan. 3, 2014.*
Rong-Jun Xie et al., "A Simple, Efficient Synthetic Route to $Sr_2Si_5N_8:Eu^{2+}$-Based Red Phosphors for White Light-Emitting Diodes", Chem. Mater., 2006, vol. 18, pp. 5578-5583.
Office Action issued Jul. 6, 2012, in Japanese patent Application No. 2011-021727 (with English-language translation).
Office Action issued Nov. 5, 2012 in Korean Patent Application No. 10-2011-0075615 (with English translation).
Office Action issued Dec. 20, 2012 in Korean Patent Application No. 10-2011-0075615 (with English-language translation).
Extended European Search Report issued May 22, 2012, in European Patent Application No. 11156400.1.
Office Action issued Apr. 1, 2013 in Chinese Patent Application No. 201110111524.4 (with English translation).
European Office Action Issued Feb. 21, 2013 in Patent Application No. 11 156 400.1.
Chinese Office Action issued Nov. 12, 2013, in China Patent Application No. 201110111524.4 (with English translation).
Chinese Office Action issued Mar. 14, 2014 in Patent Application No. 201110111524.4 with English Translation.

* cited by examiner

*Primary Examiner* — Carol M Koslow
*Assistant Examiner* — Lynne Edmondson
(74) *Attorney, Agent, or Firm* — Oblon, Spivak, McClelland, Maier & Neustadt, L.L.P.

(57) ABSTRACT

The embodiment provides a process for production of an oxynitride fluorescent substance. In the process, a compound represented by the formula: $(Sr,Eu)_2Si_5N_8$, silicon nitride and aluminum nitride are mixed and then fired in a nitrogen atmosphere under high pressure.

12 Claims, 5 Drawing Sheets

PROCESS FOR PRODUCTION OF FLUORESCENT SUBSTANCE

CROSS-REFERENCE TO RELATED APPLICATIONS

This application is a Division of and claims the benefit of priority under 35 U.S.C. §120 from U.S. Ser. No. 13/036,410, filed Feb. 28, 2011 and is based upon and claims the benefit of priority from the prior Japanese Patent Applications No. 2010-193789, filed on Aug. 31, 2010, and No. 2011-21727, filed on Feb. 3, 2011; the entire contents of which are incorporated herein by reference.

FIELD

The present embodiment relates to a process for production of an oxynitride fluorescent substance.

BACKGROUND

A white light-emitting LED device, which is a single device comprising a fluorescent substance and a semi-conductor light-emitting element such as LED in combination so as to give off white light, is becoming popularly used nowadays as a light source for illumination and the like. The fluorescent substance employed in the white light-emitting LED device is required to exhibit high luminous efficiency when excited by near UV to blue light. For use as that fluorescent substance, various oxynitride fluorescent substances have been proposed. For instance, WO07/105631 discloses a green light-emitting oxynitride fluorescent substance, whose crystal structure is disclosed to be the same as $Sr_3Al_3Si_{13}O_2N_{21}$ in JP-A 2010-31201 (KOKAI).

In a conventional process for producing a green light-emitting SiAlON phosphor, materials such as $SrCO_3$, AlN, $Si_3N_4$ and $Eu_2O_3$ are mixed and then fired in a nitrogen atmosphere under high pressure. However, this process has a problem of forming a considerable amount of by-products (variant phase crystals) that emit luminescence of colors other than green.

For the purpose of preventing the formation of the by-products, it is studied, for example, to adopt $Sr_3N_2$, EuN, $Si_3N_4$, $Al_2O_3$ and AlN as the materials that are mixed and then fired in a nitrogen atmosphere under high pressure. However, although this method enables to prevent the formation of the by-products, $Sr_3N_2$ used as the Sr source in the method is chemically so unstable as to decompose readily in air and hence is very difficult to handle. In addition, $Sr_3N_2$ is an expensive compound.

DETAILED DESCRIPTION

Embodiments will now be explained with reference to the accompanying drawings.

The present embodiment resides in a process for production of an oxynitride fluorescent substance, comprising a step in which a compound represented by the formula: $(Sr,Eu)_2Si_5N_8$, silicon nitride and aluminum nitride are mixed and then fired in a nitrogen atmosphere under high pressure.

Oxynitride Fluorescent Substance

In a first process of the embodiment for production of an oxynitride fluorescent substance, a compound represented by the formula: $(Sr,Eu)_2Si_5N_8$ is used in place of the conventional material. In addition to that compound, silicon nitride, silicon powder or a combination thereof and aluminum nitride are mixed and then fired in a nitrogen atmosphere under high (increased) pressure. On the other hand, a second process of the embodiment comprises two steps: that is, the first step in which an intermediate product represented by $(Sr,Eu)_2Si_5N_8$ is synthesized from a compound containing oxygen and strontium, such as, strontium oxide (SrO) and strontium hydroxide (Sr(OH)$_2$), which are inexpensive materials; and the second step in which the intermediate product and other materials are fired in the same manner as in the above first process. Further, in a third process of the embodiment, a mixture is used that contains first-phase crystals having the same crystal structure as $Sr_2Al_2Si_{10}O_4N_{14}$ and second-phase crystals having the same crystal structure as $Sr_2Al_3Si_7ON_{13}$.

The oxynitride fluorescent substance aimed by each process of the embodiment has the same crystal structure as $Sr_3Al_3Si_{13}O_2N_{21}$. Hereinafter, such oxynitride fluorescent substance is often referred to as "$Sr_3Al_3Si_{13}O_2N_{21}$-type phosphor". This type of fluorescent substance is based on $Sr_3Al_3Si_{13}O_2N_{21}$ phosphor, but the phosphor is modified by replacing its constituting elements (i.e., Sr, Al, Si, O and N) with other elements or by doping with other metal elements such as Eu.

The $Sr_3Al_3Si_{13}O_2N_{21}$-type phosphor can be identified by X-ray diffraction or neutron diffraction. This means that the $Sr_3Al_3Si_{13}O_2N_{21}$-type phosphor includes not only a substance exhibiting the same XRD profile as $Sr_3Al_3Si_{13}O_2N_{21}$ but also a substance having a crystal structure in which the constituting elements are so doped with other elements as to change the lattice constants within particular ranges. The constituting elements of $Sr_3Al_3Si_{13}O_2N_{21}$ crystal may be replaced with other elements in such a way described below in detail. Specifically, Sr in the crystal may be replaced with the emission center element Eu. Further, Al and Si may be partly substituted with each other, and at the same time O and N may be partly substituted with each other. Examples of that substance include $Sr_3Al_2Si_{14}ON_{22}$, $Sr_3AlSi_{15}N_{23}$, $Sr_3Al_4Si_{12}O_3N_{20}$, $Sr_3Al_5Si_{11}O_4N_{19}$ and $Sr_3Al_6Si_{10}O_5N_{18}$. These substances have crystal structures belonging to the $Sr_3Al_3Si_{13}O_2N_{21}$-type crystal.

In the case where the crystal is slightly doped with Eu or the like, it can be judged by the following simple method whether or not the doped crystal belongs to the $Sr_3Al_3Si_{13}O_2N_{21}$ type phosphor. Specifically, after an oxynitride fluorescent substance is produced by the process of the embodiment, the XRD profile thereof is measured and then the positions of the diffraction peaks are compared with those in the XRD profile of $Sr_3Al_3Si_{13}O_2N_{21}$. As a result, if the positions of the main peaks are identical, the produced substance can be regarded as a $Sr_3Al_3Si_{13}O_2N_{21}$-type phosphor. As the main peaks for comparison, it is preferred to select 10 peaks having strong diffraction intensity.

The $Sr_3Al_3Si_{13}O_2N_{21}$-type phosphor aimed by the process of the embodiment is preferably represented by the following formula:

$$(Sr_{1-x}Eu_x)_a AlSi_b O_c N_d$$

in which x, a, b, c and d are numbers satisfying the conditions of $0<x<1$ (preferably, $0.0<x<0.3$), $0.93<a<1.3$ (preferably, $0.93<a<1.1$), $4.0<b<5.8$ (preferably, $4.0<b<4.3$), $0.6<c<1.0$ (preferably, $0.6<c<0.9$) and $6<d<11$ (preferably, $6<d<8$), respectively. This fluorescent substance is characterized by containing oxygen only in a small amount. Specifically, the ratio c/a in the above formula, namely, the ratio by mole of oxygen to the sum of strontium and europium, is preferably less than 1.0 because such fluorescent substance has excellent luminance characteristics.

First Process of the Embodiment

In a first process of the embodiment, a compound represented by $(Sr,Eu)_2Si_5N_8$ is used as a material to produce the above $Sr_3Al_3Si_{13}O_2N_{21}$-type phosphor. The compound $(Sr,Eu)_2Si_5N_8$ can be synthesized by any method, such as, by the method described in Xie et al., Chem. Mater. 18, 5578(2006), in which a mixture of $SrCO_3$, $Eu_2O_3$ and $Si_3N_4$ is fired at 1600° C. under 0.5 Mpa in a nitrogen atmosphere to synthesize $(Sr,Eu)_2Si_5N_8$. The synthesized $(Sr,Eu)_2Si_5N_8$ is then fired together with other materials that supply complementary components necessary for constituting the aimed oxynitride fluorescent substance, to produce the oxynitride fluorescent substance.

The materials other than $(Sr,Eu)_2Si_5N_8$ are silicon nitride, silicon powder or a combination thereof and aluminum nitride. In the first process, those materials are mixed and then the mixture is fired in a nitrogen atmosphere under high pressure.

It should be noted that the materials include no oxide. That is for the purpose of controlling the oxygen content in the resultant oxynitride fluorescent substance. If the oxygen content is too high, the resultant product contains variant phase crystals in such a large amount that the total luminance characteristics are impaired.

The material mixture contains silicon nitride, silicon powder or a combination thereof as a silicon source. Since silicon powder is apt to prevent the formation of variant phase crystals, it is preferred to adopt silicon powder as the silicon source. It is not clear why silicon powder prevents the formation of variant phase crystals, but is presumed because silicon powder has relatively high reactivity as compared with silicon nitride and the like.

From the viewpoint of the reactivity, the silicon powder preferably has a small mean particle size. Specifically, the mean particle size is preferably less than 150 μm, further preferably less than 50 μm. On the other hand, however, if the silicon powder contains oxygen and other impurities, the resultant luminance characteristics are often impaired. From this viewpoint, the silicon powder preferably has a large mean particle size. Specifically, the mean particle size is preferably not less than 5 μm. Here, the "mean particle size" means a 50% median diameter, which can be determined by means of, for example, a laser diffraction/scattering particle size analyzer manufactured by HORIBA, Ltd.

If the materials contain oxygen in too small an amount, aluminum oxide ($Al_2O_3$) can be used as an auxiliary material so as to control the oxygen content in the resultant oxynitride fluorescent substance. The amount of the auxiliary material is so determined that the ratio by mole among the sum of Sr and Eu, Al (that is, the total amount of aluminum in aluminum nitride and aluminum oxide) and Si (that is, the total amount of silicon in $(Sr,Eu)_2Si_5N_8$ and the after-added silicon substances such as silicon nitride and silicon powder) may correspond to the component ratio of the aimed fluorescent substance. Specifically, the material mixture used in the final step is so prepared as to contain Sr, Eu, Al and Si in such amounts that the molar ratio among Sr+Eu, Al and Si may correspond to a:1:b of $(Sr_{1-x}Eu_x)_a AlSi_b O_c N_d$. However, Si may volatilize during the firing procedure in the final step. In that case, the amount of silicon nitride or silicon powder is preferably designed to be larger than the theoretical value.

Form the viewpoint of production cost, the firing is preferably carried out at a low temperature. If the firing temperature is 1700° C. or more, it is possible in most cases to obtain a fluorescent substance having satisfying characteristics. The firing temperature is, therefore, preferably 1700° C. or more. Further, from the viewpoint of improving the yield, the firing temperature is preferably 1800° C. or more.

The materials are fired in a nitrogen atmosphere under high pressure. The pressure needs to be higher than atmospheric pressure, and is generally 5 atm or more, preferably 7 to 10 atm.

There is no particular restriction on the firing container used in the firing procedure. However, since the firing temperature is relatively high, the firing container is preferably a BN crucible.

Second Process of the Embodiment

In the first process, $(Sr,Eu)_2Si_5N_8$ is used as one of the starting materials. However, $(Sr,Eu)_2Si_5N_8$ may be synthesized and then continuously or discontinuously fired together with other materials that supply complementary components necessary for constituting the aimed oxynitride fluorescent substance, to produce the oxynitride fluorescent substance.

Specifically, the oxynitride fluorescent substance can be produced by two steps, that is, (i) the first step in which a compound containing oxygen and strontium, europium oxide ($Eu_2O_3$), and silicon powder (Si powder) or silicon nitride ($Si_3N_4$) are mixed and placed in a firing container made of non-oxide material, and then fired in an atmosphere containing hydrogen and nitrogen; and (ii) the second step in which the $(Sr,Eu)_2Si_5N_8$-containing intermediate product obtained in the first step, silicon nitride ($Si_3N_4$), silicon powder (Si powder) or a combination thereof and aluminum nitride (AlN) are mixed and then fired in a nitrogen atmosphere under high pressure. This is a second process according to the present embodiment.

In a convention process for producing a $Sr_3Al_3Si_{13}O_2N_{21}$-type phosphor, $SrCO_3$ as the Sr source and $Eu_2O_3$ as the source of activating element Eu are fired in a nitrogen atmosphere under high pressure. However, this process often produces a considerable amount of variant phase crystals as well as the aimed fluorescent substance. Further, the present inventors have found that, even if the above two-step process is adopted, $SrCO_3$ as the Sr source increases the oxygen content of the intermediate product obtained in the first step and consequently variant phase crystals containing much oxygen are liable to form in the oxynitride fluorescent substance obtained in the second step.

In the second process, a compound containing oxygen and strontium is used as the Sr source. Examples of the compound containing oxygen and strontium include strontium oxide (SrO) and strontium hydroxide ($Sr(OH)_2$), which are hydroscopic but easy to weigh out and treat in air unless they are left for long time. In addition, they are inexpensive materials. Accordingly, from the industrial viewpoint, it is greatly significant to adopt them in place of $Sr_3N_2$, which is expensive and unstable. Further, since they are apt to reduce the above problem, SrO and $Sr(OH)_2$ are favorable materials.

In the first step of the second process according to the embodiment, a firing container used in the firing procedure is made of non-oxide material. Preferred examples of the container include firing containers made of boron nitride (BN) or silicon carbide (SiC). That kind of firing containers enables to reduce sufficiently the oxygen content of the intermediate product obtained in the first step. If a firing container made of oxide such as alumina is used in the first step, the intermediate product contains oxygen in such a large amount that variant phase crystals are formed in a considerable amount in the oxynitride fluorescent substance obtained in the second step. Since the variant phase crystals are obstructive factors hindering the fluorescent substance from emitting luminescence, the substance containing the variant phase crystals exhibits poor luminance efficiency.

The materials in the first step of the second process according to the embodiment include a compound of europium, which serves as the emission center element, and a compound of silicon, which constitutes a part of the phosphor crystal. As the europium compound, $Eu_2O_3$ is used. Although other europium compounds such as $Eu_2N_3$ are usable, $Eu_2O_3$ is preferred in view of production cost. However, if the intermediate product is required to contain oxygen only in a very small amount, a considerable amount of $Eu_2N_3$ may be used in combination. As the silicon compound, $Si_3N_4$ or Si powder is used. These silicon compounds contain oxygen only in small amounts, and hence are advantageous to keep the oxygen content at a low level in the intermediate product. Further, they are chemically stable enough to treat in air without problems or difficulties.

The intermediate product obtained in the first step indispensably contains a component represented by $(Sr,Eu)_2Si_5N_8$. This component, therefore, corresponds to the aforementioned material in the first process of the embodiment. The component emits orange or red luminescence having an emission peak in the wavelength range of 600 nm or longer. The intermediate product may contain other oxygen-containing phases such as $(Sr,Eu)_2SiO_4$. However, in order to obtain the aimed fluorescent substance containing only a small amount of variant phase crystals, it is necessary to reduce the ratio by mole of oxygen to the sum of strontium and europium and it is preferred that the ratio be less than 1.0. If the intermediate product contains oxygen in too large an amount, it is difficult in the second step to prevent the formation of variant phase crystals containing considerable amounts of oxygen The firing temperature in the first step is preferably about in the range of 1300 to 1600° C. If the temperature is below this range, the $(Sr,Eu)_2Si_5N_8$ phase may be formed insufficiently. On the other hand, if the temperature is above the range, the resultant substance is liable to have composition different from the aimed composition, for example.

The firing procedure in the first step is carried out in an atmosphere containing hydrogen and nitrogen, namely, in a reductive atmosphere, so as to reduce the oxygen content in the intermediate product. There is no particular restriction on the ratio between hydrogen and nitrogen in the atmosphere, but the ratio is generally in the range of 2:98 to 75:25. The atmosphere may contain other inert gases, but needs to contain oxygen in as small an amount as possible. There is no particular restriction on the firing pressure, and hence the firing procedure is carried out generally under atmospheric pressure.

In the second step, the intermediate product obtained in the first step is mixed with at least one of silicon nitride, silicon powder or a combination thereof and with aluminum nitride (AlN), to prepare a material mixture. The materials are then made to react, so as to produce the aimed oxynitride fluorescent substance. The intermediate product obtained in the first step corresponds to the $(Sr,Eu)_2Si_5N_8$ material in the aforementioned first process of the embodiment. Accordingly, the auxiliary material and the firing conditions in the second step can be the same as those in the first process of the embodiment.

There is no particular restriction on the firing container used in the second step. The non-oxide material-made container used in the first step may be successively used again in the second step. Since the firing temperature in the second step is relatively high, the firing container is preferably a BN crucible.

In this process for production of an oxynitride fluorescent substance, SrO or $Sr(OH)_2$ can be used as one of the materials. Since they are inexpensive and chemically stable, the process enables to reduce the production cost and to produce an oxynitride fluorescent substance containing variant phase crystals, which impair the luminance characteristics, only in such a small amount as to have high luminance efficiency.

Third Process of the Embodiment

A third process of the embodiment comprises a step in which a mixture containing first-phase crystals having the same crystal structure as $Sr_2Al_2Si_{10}O_4N_{14}$ and second-phase crystals having the same crystal structure as $Sr_2Al_3Si_7ON_{13}$ is placed in a firing container and then fired in a nitrogen atmosphere under high pressure. The first-phase crystal gives the X-ray diffraction pattern shown in JCPDS card No. 89-8113, and Sr in the crystal may be partly replaced with Eu. Further, unless the crystal structure is essentially changed, Al and Si may be partly substituted with each other and/or O and N may be partly substituted with each other. On the other hand, the second-phase crystal is shown in JP-A 2010-106127 (KOKAI), and Sr in the crystal may be also partly replaced with Eu. Further, also unless the crystal structure is essentially changed, Al and Si may be partly substituted with each other and/or O and N may be partly substituted with each other.

In order to prepare the mixture of first-phase and second-phase crystals, the first-phase and second-phase crystals may be separately and independently prepared as two different substances and then mixed. However, the mixture can be directly produced. Specifically, the mixture can be produced by mixing and firing a compound represented by the formula: $(Sr,Eu)_2Si_5N_8$, silicon powder or silicon nitride, and aluminum nitride in an atmosphere containing hydrogen and nitrogen.

The material mixture in the third process of the embodiment corresponds to that in the first process and also to that in the second step of the second process. This means that the material mixture of the third process can be obtained by pre-firing the materials in an atmosphere containing hydrogen and nitrogen before the firing procedure in the first process or in the second step of the second process. The mixture thus obtained by performing the pre-firing in the first or second process can be regarded as a precursor of green light-emitting fluorescent substance. The precursor is fired in a nitrogen atmosphere under high pressure, to produce a green light-emitting fluorescent substance.

The third process of the embodiment enables to produce an oxynitride fluorescent substance containing variant phase crystals only in such a small amount as to have high luminance efficiency. The third process can be combined with the first or second process, and thereby the variant phase crystals can be reduced to improve remarkably the luminance efficiency.

There is no particular restriction on the pre-firing temperature. The temperature is preferably high enough to promote the aimed reaction efficiently. On the other hand, however, the temperature is preferably low enough to prevent the reaction from proceeding unevenly and to prevent the formation of variant phase crystals. Specifically, the pre-firing temperature is preferably 1400 to 1650° C., more preferably 1500 to 1650° C. The pre-firing procedure is carried out in a reductive atmosphere containing hydrogen and nitrogen. There is no particular restriction on the ratio between hydrogen and nitrogen in the atmosphere, but the ratio is generally in the range of 2:98 to 75:25. The atmosphere may contain other inert gases, but needs to contain oxygen in as small an amount as possible. There is no particular restriction on the pre-firing pressure, and hence the pre-firing procedure is carried out generally under atmospheric pressure.

After the pre-firing, the materials are fired under the same conditions as in the first process or in the second step of the second process, to obtain the aimed oxynitride fluorescent substance.

Additional Firing Procedure

Successively after the firing procedure in each process, the materials may be further subjected to additional firing. Specifically, the additional firing procedure can be carried out at a temperature higher by 50 to 200° C. than the firing temperature of the firing procedure, so as to fire the materials completely and, as a result, to improve the yield and/or purity of the resultant oxynitride fluorescent substance.

There is no particular restriction on the firing container used in the additional firing procedure. However, since the firing temperature of the additional firing is relatively high as compared with that of the firing procedure, the firing container is preferably a BN crucible.

EXAMPLES

The embodiment is further explained by the following examples.

Comparative Example 1

In accordance with Example 1 of JP-A 2010-31201 (KOKAI), $Sr_3N_2$, EuN, $Si_3N_4$, $Al_2O_3$ and AlN in the amounts of 2.676 g, 0.398 g, 6.080 g, 0.680 g and 0.683 g, respectively, were weighed out and dry-mixed. The mixture was placed in a BN container and then fired at 1850° C. for 4 hours under 7.5 atm of $N_2$ atmosphere, to synthesize a green-light emitting fluorescent substance.

Example 1

Figure 1:
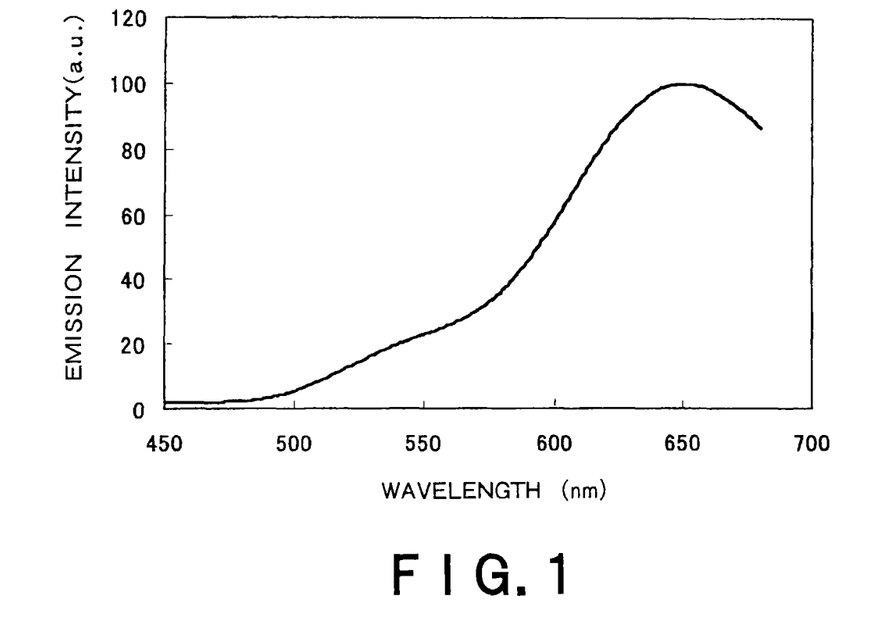
FIG. 1 shows an emission spectrum of the intermediate product produced in Example 1.
Figure 2:
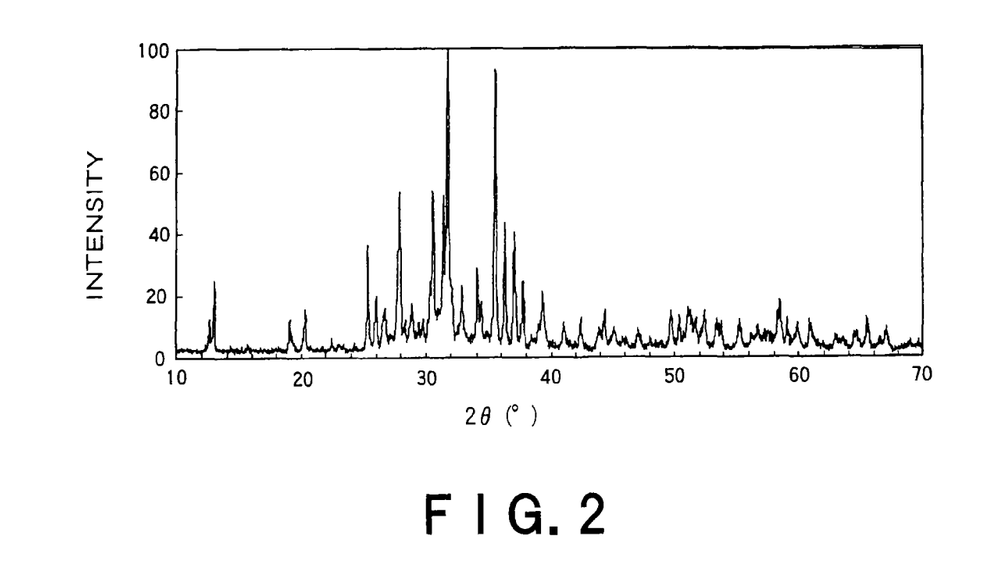
FIG. 2 shows an X-ray diffraction pattern of the intermediate product produced in Example 1.

As the starting materials, SrO, $Eu_2O_3$ and Si powder in the amounts of 7.46 g, 1.41 g and 5.62 g, respectively, were weighed out and dry-mixed. In the obtained mixture, the composition ratio (molar ratio) of the elements Sr:Eu:Si was 1.8:0.2:5.0. The mixture was placed in a BN container and then fired at 1500° C. for 8 hours under atmospheric pressure in a reductive atmosphere in which flow rates of $H_2$ and $N_2$ were 5 L/min. and 5 L/min., respectively, to obtain an intermediate product in the first step. The intermediate product emitted orange luminescence having a peak at about 650 nm when excited by UV light at 365 nm. The observed emission spectrum was shown in FIG. 1. Further, the intermediate product was subjected to X-ray diffraction measurement by use of Cu—Kα line, to obtain a diffraction pattern shown in FIG. 2. The diffraction pattern had many diffraction lines corresponding to lines of the pattern shown in Xie et al., Chem. Mater. 18, 5578(2006), and therefore it was verified that the intermediate product contained at least a component represented by $(Sr,Eu)_2Si_5N_8$. The intermediate product was then subjected to composition analysis, to measure the ratio by mole of oxygen to the sum of strontium and europium. As a result, the ratio was found to be 0.44 and thereby it was verified that the intermediate product contained oxygen only in a small amount.

Figure 3:
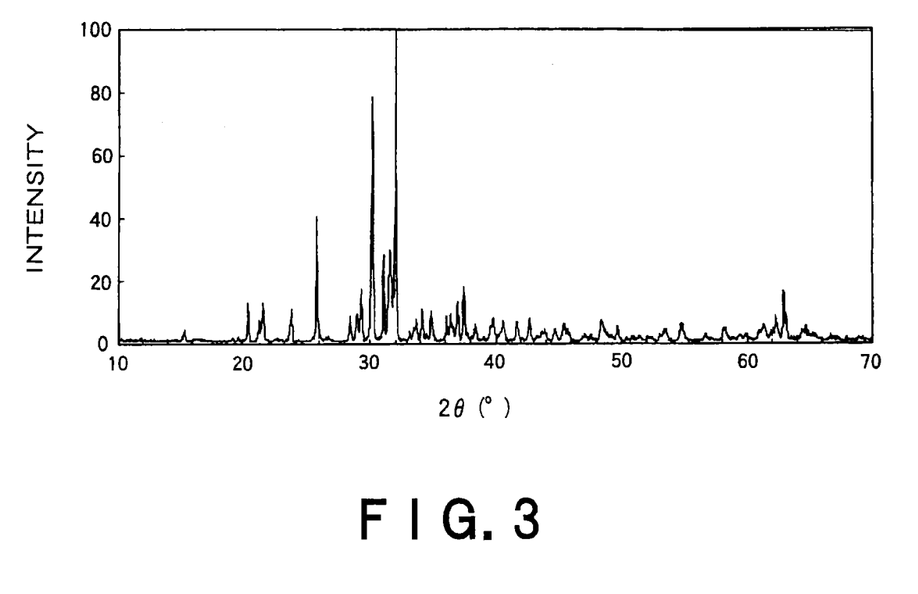
FIG. 3 shows an X-ray diffraction pattern of the green light-emitting oxynitride fluorescent substance produced in Example 1.
Figure 4:
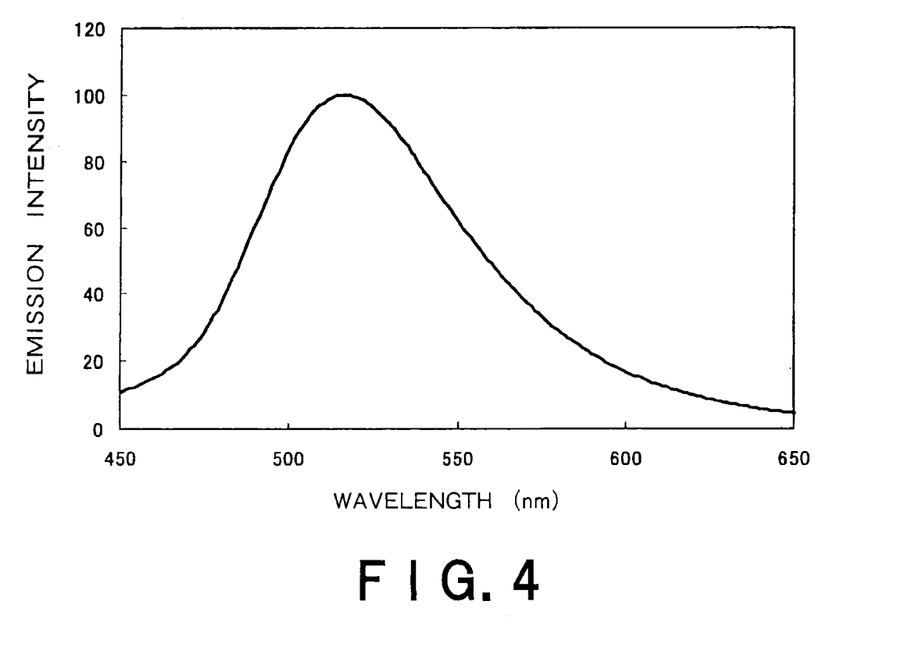
FIG. 4 shows an emission spectrum of the green light-emitting oxynitride fluorescent substance produced in Example 1.

Successively in the second step, the intermediate product obtained in the first step, $Si_3N_4$ and AlN in the amounts of 8.20 g, 3.09 g and 1.48 g, respectively, were weighed out and dry-mixed. In the obtained mixture, the composition ratio (molar ratio) of the elements Sr:Eu:Al:Si was 0.9:0.1:1.0:4.3. The mixture was placed in a BN crucible and then fired at 1850° C. for 8 hours under 7.5 atm of $N_2$ atmosphere, to synthesize a green-light emitting oxynitride fluorescent substance. The obtained fluorescent substance was subjected to X-ray diffraction measurement by use of Cu—Kα line, to obtain a diffraction pattern shown in FIG. 3. The diffraction pattern had many diffraction lines corresponding to lines of the pattern shown in JP-A 2010-31201 (KOKAI). For example, both patterns had the same lines at the diffraction angles of about 20°, 26° and 32°. Further, the obtained substance exhibited an emission spectrum shown in FIG. 4 when excited by UV light at 365 nm. The emission intensity of the obtained substance was compared with that of the green-light emitting fluorescent substance produced in Comparative Example 1, and thereby it was found that the luminance efficiency of the obtained substance was 1.2 times as high as that of the substance produced in Comparative Example 1.

Example 2

As the starting materials, SrO, $Eu_2O_3$ and $Si_3N_4$ in the amounts of 9.33 g, 1.76 g and 4.68 g, respectively, were weighed out and dry-mixed. In the obtained mixture, the composition ratio (molar ratio) of the elements Sr:Eu:Si was 0.9:0.1:1.0. The mixture was placed in a SiC-made container and then fired at 1400° C. for 8 hours under atmospheric pressure in a reductive atmosphere in which flow rates of $H_2$ and $N_2$ were 5 L/min. and 5 L/min., respectively, to obtain an intermediate product in the first step. The intermediate product emitted orange luminescence having a peak at about 640 nm when excited by UV light at 365 nm. Further, the intermediate product was subjected to X-ray diffraction measurement, and thereby verified to contain a component represented by $(Sr,Eu)_2Si_5N_8$. The intermediate product was then subjected to composition analysis, to measure the ratio by mole of oxygen to the sum of strontium and europium. As a result, the ratio was found to be 0.73, and thereby it was verified that the intermediate product contained oxygen only in a small amount.

Successively in the second step, the intermediate product obtained in the first step, $Si_3N_4$ and AlN in the amounts of 5.35 g, 4.21 g and 1.11 g, respectively, were weighed out and dry-mixed. In the obtained mixture, the composition ratio (molar ratio) of the elements Sr:Eu:Al:Si was 0.9:0.1:1.0:4.3. The mixture was placed in a BN crucible and then fired at 1850° C. for 8 hours under 7.5 atm of $N_2$ atmosphere, to synthesize a green-light emitting oxynitride fluorescent substance. The fluorescent substance was subjected to X-ray diffraction measurement. As a result, the obtained diffraction pattern had many diffraction lines corresponding to lines of the pattern shown in JP-A 2010-31201 (KOKAI). Further, the fluorescent substance was excited by UV light to measure emission intensity, and thereby it was found that the luminance efficiency of the produced substance was 1.05 times as high as that of the green-light emitting fluorescent substance produced in Comparative Example 1.

Examples 3 and 4

As the starting materials, $Sr(OH)_2$, $Eu_2O_3$ and Si powder in the amounts of 10.95 g, 1.76 g and 5.62 g, respectively, were weighed out and dry-mixed. In the obtained mixture, the composition ratio (molar ratio) of the elements Sr:Eu:Si was 0.9:0.1:2.0. The mixture was placed in a BN container and then fired at 1600° C. for 8 hours under atmospheric pressure in a reductive atmosphere in which flow rates of $H_2$ and $N_2$ were 5 L/min. and 5 L/min., respectively, to obtain an intermediate product in the first step. The intermediate product emitted yellowish orange luminescence having a peak at about 650 nm when excited by UV light at 365 nm. Further, the intermediate product was subjected to X-ray diffraction measurement, and thereby verified to contain a component represented by $(Sr,Eu)_2Si_5N_8$. The intermediate product was then subjected to composition analysis, to measure the ratio by mole of oxygen to the sum of strontium and europium. As a result, the ratio was found to be 0.34, and thereby it was verified that the intermediate product contained oxygen only in a small amount.

Successively in the second step, the intermediate product obtained in the first step, $Si_3N_4$ and AlN in the amounts of 4.59 g, 2.62 g and 0.98 g, respectively, were weighed out and dry-mixed. In the obtained mixture, the composition ratio (molar ratio) of the elements Sr:Eu:Al:Si was 0.9:0.1:1.0:4.3. The mixture was placed in a BN crucible and then fired at 1800° C. for 8 hours under 7.5 atm of $N_2$ atmosphere, to synthesize a green-light emitting oxynitride fluorescent substance of Example 3. This fluorescent substance was subjected to X-ray diffraction measurement. As a result, the obtained diffraction pattern had many diffraction lines corresponding to lines of the pattern shown in JP-A 2010-31201 (KOKAI). Further, the fluorescent substance was excited by UV light to measure emission intensity, and thereby it was found that the luminance efficiency of the produced substance was 0.5 times as high as that of the green-light emitting fluorescent substance produced in Comparative Example 1.

The fluorescent substance of Example 3 was pulverized in a mortar. The pulverized substance was placed in a BN crucible and then subjected to additional firing at 1900° C. for 8 hours under 7.5 atm of $N_2$ atmosphere, to synthesize a green-light emitting oxynitride fluorescent substance of Example 4. This fluorescent substance was subjected to X-ray diffraction measurement. As a result, the obtained diffraction pattern had many diffraction lines corresponding to lines of the pattern shown in JP-A 2010-31201 (KOKAI). Further, the fluorescent substance was excited by UV light to measure emission intensity, and thereby it was found that the luminance efficiency of the produced substance was 1.15 times as high as that of the green-light emitting fluorescent substance produced in Comparative Example 1.

Example 5

Under the conditions described in Xie et al., Chem. Mater. 18, 5578(2006), $Sr_2Si_5N_8$:Eu phosphor was synthesized from $SrCO_3$, $Eu_2O_3$ and $Si_3N_4$. The obtained phosphor, $Si_3N_4$, $Al_2O_3$ and AlN in the amounts of 5.29 g, 2.06 g, 0.54 g and 0.55 g, respectively, were weighed out and dry-mixed. In the obtained mixture, the composition ratio (molar ratio) of the elements Sr:Eu:Al:Si was 0.9:0.1:1.0:4.3. The mixture was placed in a BN crucible and then fired at 1850° C. for 8 hours under 7.5 atm of $N_2$ atmosphere, to synthesize a green-light emitting oxy-nitride fluorescent substance of Example 5. This fluorescent substance was subjected to X-ray diffraction measurement. As a result, the obtained diffraction pattern had many diffraction lines corresponding to lines of the pattern shown in JP-A 2010-31201 (KOKAI). Further, the fluorescent substance was excited by UV light to measure emission intensity, and thereby it was found that the luminance efficiency of the produced substance was 1.05 times as high as that of the green-light emitting fluorescent substance produced in Comparative Example 1.

Comparative Example 2

As the starting materials, $SrCO_3$, $Eu_2O_3$ and Si powder in the amounts of 26.58 g, 3.52 g and 5.62 g, respectively, were weighed out and dry-mixed. In the obtained mixture, the composition ratio (molar ratio) of the elements Sr:Eu:Si was 0.9:0.1:1.0. The mixture was placed in an alumina crucible and then fired at 1400° C. for 4 hours under atmospheric pressure in a reductive atmosphere in which flow rates of $H_2$ and $N_2$ were 5 L/min. and 5 L/min., respectively, to obtain an intermediate product in the first step. The intermediate product emitted yellow luminescence having a peak at about 590 nm when excited by UV light at 365 nm. Further, the intermediate product was subjected to X-ray diffraction measurement, to obtain a diffraction pattern having many diffraction lines corresponding to lines of the pattern shown in JCPDS card No. 39-1256. It was, therefore, verified that the intermediate product contained $Sr_2SiO_4$ phase as the main phase. The intermediate product was then subjected to composition analysis, to measure the ratio by mole of oxygen to the sum of strontium and europium. As a result, the ratio was found to be 1.5, and thereby it was verified that the intermediate product contained oxygen in a large amount.

Successively in the second step, the intermediate product obtained in the first step, $Si_3N_4$ and AlN in the amounts of 4.80 g, 4.68 g and 1.23 g, respectively, were weighed out and dry-mixed. In the obtained mixture, the composition ratio (molar ratio) of the elements Sr:Eu:Al:Si was 0.9:0.1:1.0:4.3.

Figure 5:
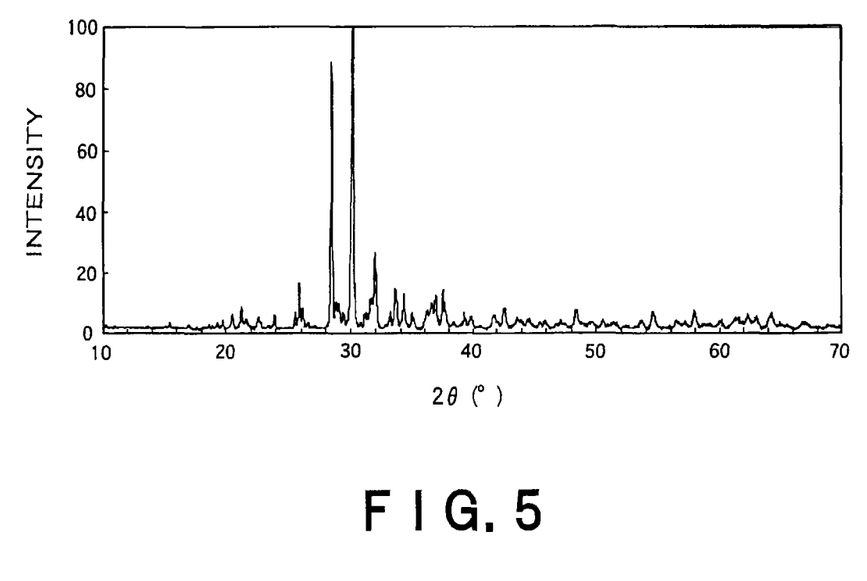
FIG. 5 shows an X-ray diffraction pattern of the fluorescent substance produced in Comparative Example 2.
Figure 6:
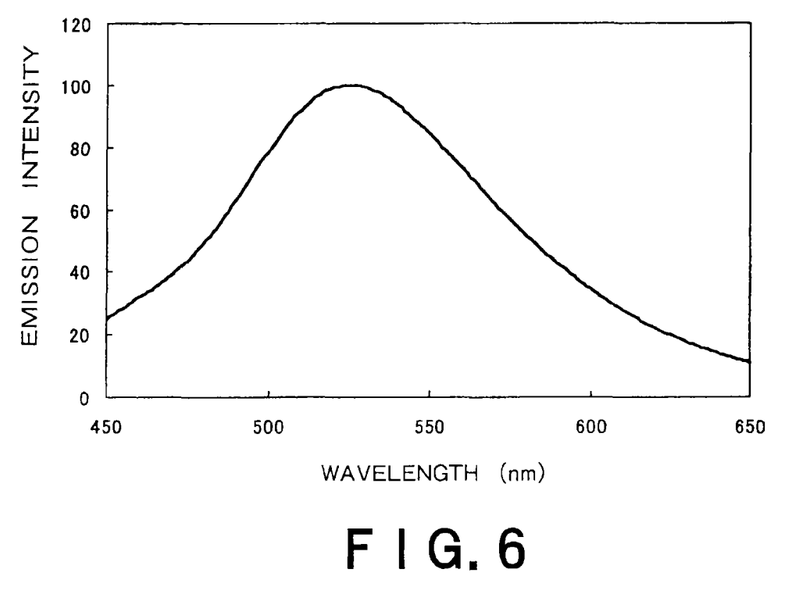
FIG. 6 shows an emission spectrum of the fluorescent substance produced in Comparative Example 2.

The mixture was placed in a BN crucible and then fired at 1850° C. for 8 hours under 7.5 atm of $N_2$ atmosphere, to synthesize a fluorescent substance of Comparative Example 2. This fluorescent substance was subjected to X-ray diffraction measurement, to obtain a diffraction pattern shown in FIG. 5. The obtained diffraction pattern was very different from the pattern shown in JP-A 2010-31201 (KOKAI), and hence it was verified that the substance of Comparative Example 2 had many variant phase crystals. Further, as shown in FIG. 6, the obtained substance exhibited an emission spectrum having a peak with broad half-width when excited by UV light at 365 nm. In addition, the emission intensity of the obtained substance was compared with that of the green-light emitting fluorescent substance produced in Comparative Example 1, and thereby it was found that the luminance efficiency of the obtained substance was only 0.68 times as high as that of the substance produced in Comparative Example 1.

Example 6

Figure 7:
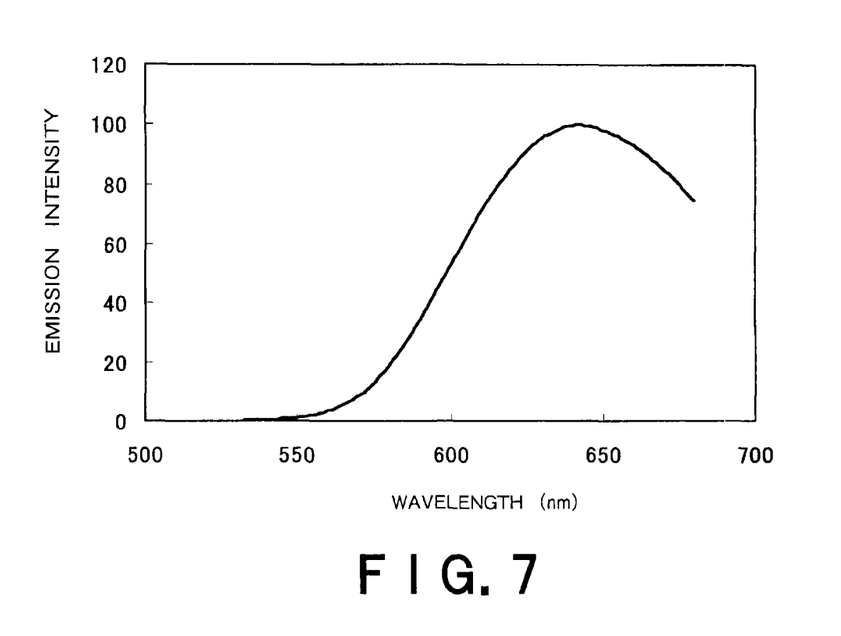
FIG. 7 shows an emission spectrum of the intermediate product produced in Example 6.

As the starting materials, SrO, $Eu_2O_3$ and Si powder in the amounts of 9.33 g, 1.76 g and 2.81 g, respectively, were weighed out and dry-mixed. In the obtained mixture, the composition ratio (molar ratio) of the elements Sr:Eu:Si was 0.9:0.1:1.0. The mixture was placed in a BN container and then fired at 1500° C. for 8 hours under atmospheric pressure in a reductive atmosphere in which flow rates of $H_2$ and $N_2$ were 5 L/min. and 5 L/min., respectively, to obtain an intermediate product in the first step. The intermediate product emitted reddish orange luminescence having a peak at about 640 nm when excited by UV light at 365 nm. The observed emission spectrum was shown in FIG. 7. Further, the intermediate product was subjected to X-ray diffraction measurement by use of Cu—Kα line, to obtain a diffraction pattern having many diffraction lines corresponding to lines of the pattern shown in Xie et al., Chem. Mater. 18, 5578(2006). It was, therefore, verified that the intermediate product contained at least a component represented by $(Sr,Eu)_2Si_5N_8$.

Figure 8:
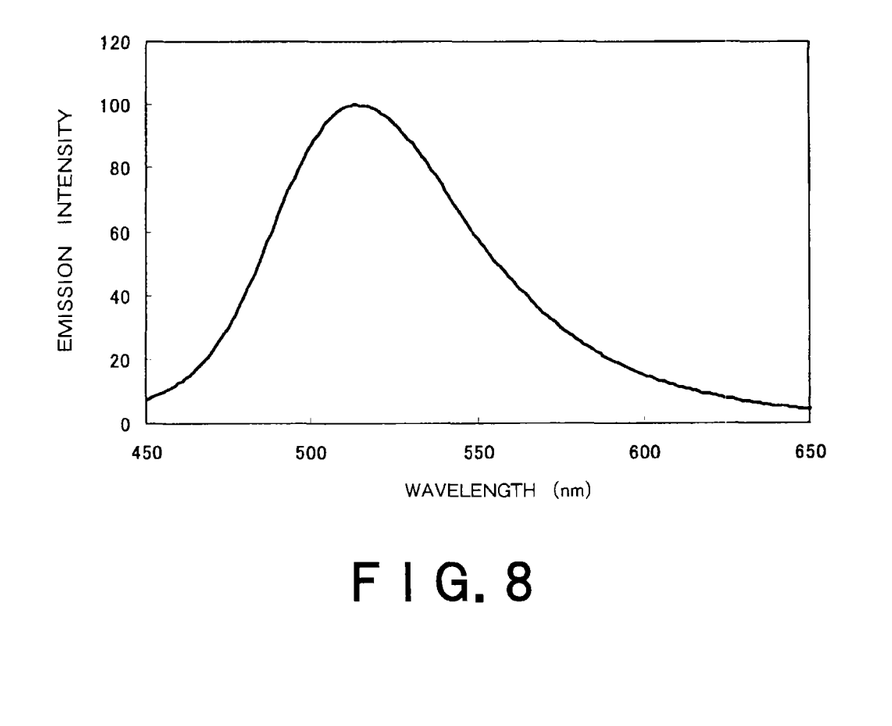
FIG. 8 shows an emission spectrum of the green light-emitting oxynitride fluorescent substance produced in Example 6.

Successively in the second step, the intermediate product obtained in the first step, Si powder having a mean particle size of 20 μm and AlN in the amounts of 5.28 g, 3.37 g and 1.48 g, respectively, were weighed out and dry-mixed. In the obtained mixture, the composition ratio (molar ratio) of the elements Sr:Eu:Al:Si was 0.9:0.1:1.0:4.3. The mixture was placed in a BN crucible and then fired at 1850° C. for 8 hours under 7.5 atm of $N_2$ atmosphere, to synthesize a green-light emitting oxynitride fluorescent substance. The obtained substance exhibited an emission spectrum shown in FIG. 8 when excited by UV light at 365 nm. The emission intensity of the obtained substance was compared with that of the green-light emitting fluorescent substance produced in Comparative Example 1, and thereby it was found that the luminance efficiency of the obtained substance was 1.1 times as high as that of the substance produced in Comparative Example 1.

Example 7

As the starting materials, $Sr(OH)_2$, $Eu_2O_3$ and $Si_3N_4$ in the amounts of 32.8 g, 5.28 g and 28.1 g, respectively, were weighed out and dry-mixed. In the obtained mixture, the composition ratio (molar ratio) of the elements Sr:Eu:Si was 0.9:0.1:2.0. The mixture was placed in a BN container and then fired at 1400° C. for 8 hours under atmospheric pressure in a reductive atmosphere in which flow rates of $H_2$ and $N_2$ were 5 L/min. and 5 L/min., respectively, to obtain an intermediate product in the first step. The intermediate product emitted orange luminescence having a peak at about 650 nm when excited by UV light at 365 nm.

Figure 9:
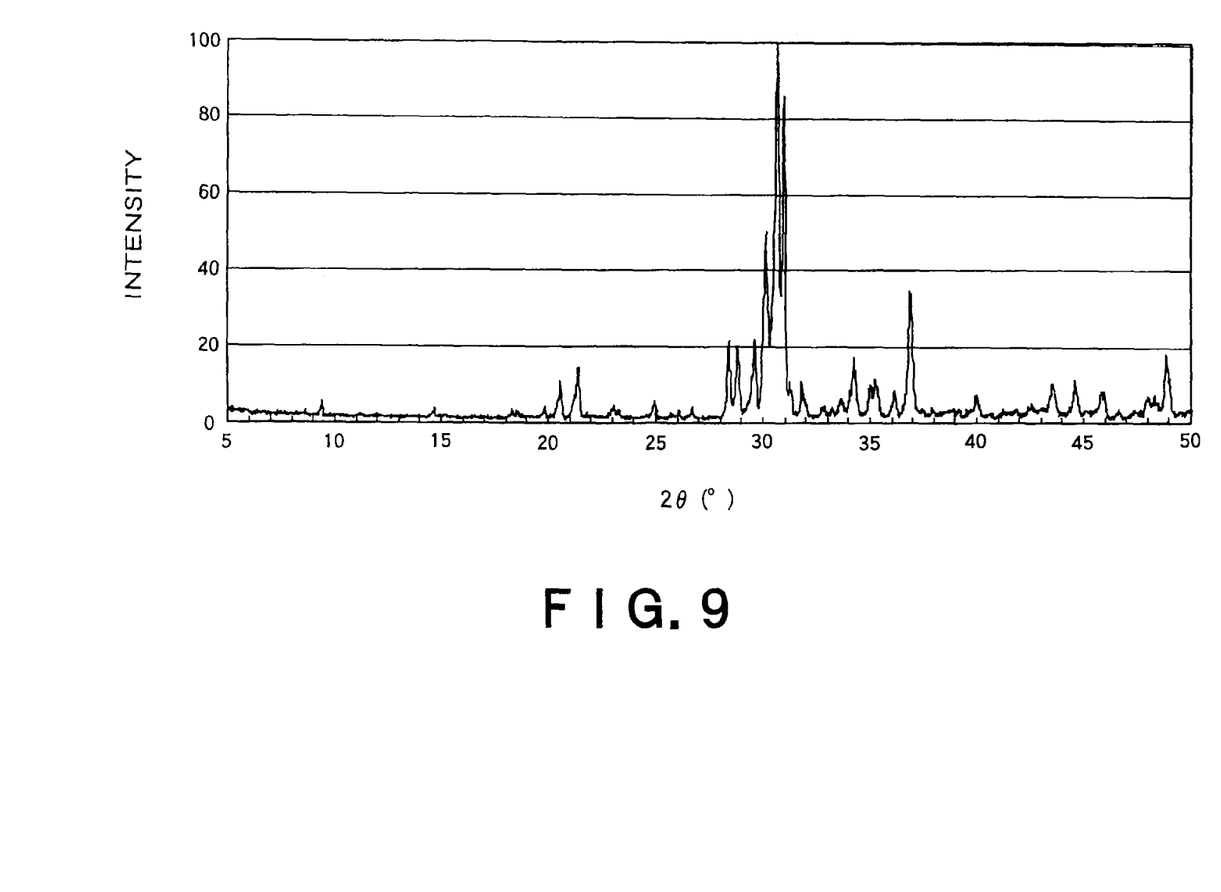
FIG. 9 shows an X-ray diffraction pattern of the precursor of green light-emitting fluorescent substance produced in Example 7.

Successively in the second step, the intermediate product obtained in the first step, Si powder and AlN in the amounts of 8.86 g, 3.03 g and 2.03 g, respectively, were weighed out and dry-mixed. In the obtained mixture, the composition ratio (molar ratio) of the elements Sr:Eu:Al:Si was 0.9:0.1:1.1:4.4. The mixture was placed in a BN crucible and then pre-fired at 1600° C. for 8 hours under atmospheric pressure in a reductive atmosphere in which flow rates of $H_2$ and $N_2$ were 5 L/min. and 5 L/min., respectively, to obtain a precursor of green light emitting fluorescent substance. The obtained precursor was subjected to X-ray diffraction measurement by use of Cu—Kα line, to obtain a diffraction pattern shown in FIG. 9. From the obtained diffraction pattern, it was verified that the precursor contained first-phase crystals having the same crystal structure as $Sr_2Al_2Si_{10}O_4N_{14}$ and second-phase crystals having the same crystal structure as $Sr_2Al_3Si_7ON_{13}$.

Thereafter, the precursor obtained by pre-firing was placed in a BN crucible and then fired at 1850° C. for 8 hours under 7.5 atm of $N_2$ atmosphere, to synthesize a green-light emitting fluorescent substance. The obtained fluorescent substance was excited by UV light at 365 nm to measure emission intensity, and thereby it was found that the luminance efficiency of the produced substance was 1.2 times as high as that of the green-light emitting fluorescent substance produced in Comparative Example 1.

Example 8

As the starting materials, $Sr(OH)_2$, $Eu_2O_3$ and Si powder in the amounts of 13.1 g, 2.11 g and 8.09 g, respectively, were weighed out and dry-mixed. In the obtained mixture, the composition ratio (molar ratio) of the elements Sr:Eu:Si was 0.9:0.1:2.4. The mixture was placed in a BN container and then fired at 1400° C. for 8 hours under atmospheric pressure in a reductive atmosphere in which flow rates of $H_2$ and $N_2$ were 5 L/min. and 5 L/min., respectively, to obtain an intermediate product in the first step. The intermediate product emitted reddish orange luminescence having a peak at about 655 nm when excited by UV light at 365 nm.

Successively in the second step, the intermediate product obtained in the first step, $Si_3N_4$ and AlN in the amounts of 9.92 g, 4.42 g and 1.94 g, respectively, were weighed out and dry-mixed. In the obtained mixture, the composition ratio (molar ratio) of the elements Sr:Eu:Al:Si was 0.9:0.1:1.05:4.5. The mixture was placed in a BN crucible and then pre-fired at 1600° C. for 8 hours under atmospheric pressure in a reductive atmosphere in which flow rates of $H_2$ and $N_2$ were 5 L/min. and 5 L/min., respectively, to obtain a precursor of green light emitting fluorescent substance. The obtained precursor was subjected to X-ray diffraction measurement by use of Cu—Kα line, and thereby verified to contain first-phase crystals having the same crystal structure as $Sr_2Al_2Si_{10}O_4N_{14}$ and second-phase crystals having the same crystal structure as $Sr_2Al_3Si_7ON_{13}$.

Thereafter, the precursor obtained by pre-firing was placed in a BN crucible and then fired at 1850° C. for 8 hours under 7.5 atm of $N_2$ atmosphere, to synthesize a green-light emitting fluorescent substance. The obtained fluorescent substance was excited by UV light at 365 nm to measure emission intensity, and thereby it was found that the luminance efficiency of the produced substance was 1.15 times as high as that of the green-light emitting fluorescent substance produced in Comparative Example 1.

Thus, the embodiment is explained by the above examples, but they by no means restrict the embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A process for production of a green light-emitting oxynitride fluorescent substance, comprising:
    a first step in which at least a compound containing oxygen and strontium, europium oxide, and silicon powder or silicon nitride are mixed and placed in a firing container made of non-oxide material, and then fired in an atmosphere containing hydrogen and nitrogen to produce an intermediate product comprising strontium, europium, silicon and nitrogen; and
    a second step in which said intermediate product obtained in the first step, silicon nitride, silicon powder or a combination thereof and aluminum nitride are mixed and then fired in a nitrogen atmosphere under high pressure, wherein said oxynitride fluorescent substance has essentially the same crystal structure as $Sr_3Al_3Si_{13}O_2N_{21}$.

2. The process according to claim 1, wherein said compound containing oxygen and strontium is strontium oxide or strontium hydroxide.

3. The process according to claim 1, wherein said intermediate product contains a component represented by the formula: $(Sr,Eu)_2Si_5N_8$.

4. The process according to claim 1, wherein said oxynitride fluorescent substance is a divalent europium-activated phosphor represented by the following formula:

$$(Sr_{1-x}Eu_x)_a AlSi_b O_c N_d$$

in which x, a, b, c and d are numbers satisfying the conditions of $0<x<1$, $0.93<a<1.3$, $4.0<b<5.8$, $0.6<c<1.0$ and $6<d<11$, respectively.

5. The process according to claim 1, wherein said intermediate product contains strontium, europium and oxygen in such amounts that the ratio by mole of oxygen to the sum of strontium and europium is less than 1.0.

6. The process according to claim 1, wherein said oxynitride fluorescent substance is a divalent europium-activated phosphor.

7. The process according to claim 1, wherein a firing temperature in the second step is 1700° C. or more.

8. The process according to claim 1, wherein a firing temperature in the first step is in the range of 1300 to 1600° C.

9. The process according to claim 1, wherein the silicon nitride, silicon powder or a combination thereof contains silicon powder.

10. The process according to claim 9, wherein said silicon powder has a mean particle size ranging from not less than 5 μm to less than 150 μm.

11. The process according to claim 1, wherein the intermediate product; silicon nitride, silicon powder or a combination thereof; and aluminum nitride are pre-fired in an atmosphere containing hydrogen and nitrogen before the firing in the second step.

12. The process according to claim 11, wherein a pre-firing temperature is in the range of 1400 to 1650° C.

* * * * *